(12) United States Patent
Condon et al.

(10) Patent No.: US 8,996,719 B2
(45) Date of Patent: Mar. 31, 2015

(54) SYSTEM AND METHOD OF ADAPTIVE TRANSPORT OF MULTIMEDIA DATA

(76) Inventors: Jeremiah Condon, Trenton, MI (US);
Greg Smith, Flower Mound, TX (US);
Matthew Szatmary, Ypsilanti, MI (US);
Donald Bisdorf, Ann Arbor, MI (US)

( * ) Notice: Subject to any disclaimer, the term of this patent is extended or adjusted under 35 U.S.C. 154(b) by 200 days.

(21) Appl. No.: 13/437,541

(22) Filed: Apr. 2, 2012

(65) Prior Publication Data
US 2012/0254457 A1 Oct. 4, 2012

Related U.S. Application Data

(60) Provisional application No. 61/471,146, filed on Apr. 3, 2011.

(51) Int. Cl.
| | |
|---|---|
| G06F 15/16 | (2006.01) |
| H04L 29/06 | (2006.01) |
| H04N 21/2343 | (2011.01) |
| H04N 21/2383 | (2011.01) |
| H04N 21/2385 | (2011.01) |
| H04N 21/24 | (2011.01) |
| H04N 21/242 | (2011.01) |
| H04N 21/2662 | (2011.01) |
| H04N 21/6373 | (2011.01) |
| H04N 21/6405 | (2011.01) |
| H04N 21/6408 | (2011.01) |
| H04N 21/845 | (2011.01) |
| H04N 21/854 | (2011.01) |

(52) U.S. Cl.
CPC .......... *H04L 65/4084* (2013.01); *H04L 65/602* (2013.01); *H04L 65/607* (2013.01); *H04N 21/23439* (2013.01); *H04N 21/2383* (2013.01); *H04N 21/2385* (2013.01); *H04N 21/2402* (2013.01); *H04N 21/242* (2013.01); *H04N 21/2662* (2013.01); *H04N 21/6373* (2013.01); *H04N 21/6405* (2013.01); *H04N 21/6408* (2013.01); *H04N 21/8455* (2013.01); *H04N 21/85406* (2013.01)
USPC ........... 709/232; 709/203; 709/213; 709/217; 709/226; 709/231; 709/235; 709/236

(58) Field of Classification Search
USPC ......... 709/203, 213, 217, 226, 231, 232, 233, 709/235, 236; 725/54, 71, 148
See application file for complete search history.

(56) References Cited

U.S. PATENT DOCUMENTS

| | | | | |
|---|---|---|---|---|
| 5,717,854 | A * | 2/1998 | Egawa et al. | 709/219 |
| 7,191,246 | B2 * | 3/2007 | Deshpande | 709/233 |
| 7,979,570 | B2 * | 7/2011 | Chapweske et al. | 709/231 |
| 8,375,140 | B2 * | 2/2013 | Tippin et al. | 709/236 |
| 8,543,720 | B2 * | 9/2013 | Wormley et al. | 709/231 |
| 2010/0228862 | A1 * | 9/2010 | Myers | 709/227 |
| 2012/0254457 | A1 * | 10/2012 | Condon et al. | 709/231 |

* cited by examiner

*Primary Examiner* — Michael Y Won
(74) *Attorney, Agent, or Firm* — Gifford, Krass, Sprinkle, Anderson & Citkowski, P.C.

(57) ABSTRACT

Network-based content distribution is improved by controlling the flow of multimedia data and streaming characteristics to ensure real-time, consistent delivery. An adaptive media distribution system includes at least one original source of a media channel, a plurality of content playback devices, and one or more stream controllers disposed between the original sources and the playback devices. Each media channel provides audio and/or video content on one or more switchable streams, each stream being encoded with different characteristics such as bitrate. The stream controllers receive streams and determine how the streams should be allocated to the playback devices so as to provide consistent delivery of the content in accordance with playback demand and the stream attributes or information.

45 Claims, 2 Drawing Sheets

SYSTEM AND METHOD OF ADAPTIVE TRANSPORT OF MULTIMEDIA DATA

REFERENCE TO RELATED APPLICATIONS

This application claims priority from U.S. Provisional Patent Application Ser. No. 61/471,146, filed Apr. 3, 2011, the entire content of which is incorporated herein by reference.

FIELD OF INVENTION

This invention relates generally to multimedia content delivery over a network and, in particular, to a system and method to dynamically control the flow of multimedia data and the streaming characteristics to ensure real-time, consistent delivery of source content.

BACKGROUND OF THE INVENTION

Consumers increasingly have some sort of IP network connection in their home, normally for access to the public Internet. In addition to Internet access, voice over IP (VOIP), and other consumer data needs, audio and video providers can use these connections to deliver content to customers, thus providing consumers with a single source for data consumption.

Providing reliable audio/video delivery to a wide body of consumers over IP networks presents the content provider with several challenges. For one, not all consumers will be able to receive data at the same rate of delivery. In particular, due to network topology and data demands from consumers at other points in the network, certain consumers will be able to receive data at much higher bitrates than others. Ideally, a content provider should give each consumer an acceptable experience. In practice, however, a provider can deliver content to consumers with low-volume connections by changing the characteristics of the audio/video data so as to allow delivery of the same content with less data, though with reduced playback quality. Attempting to deliver content with a higher volume of data than the consumer can effectively receive will result in data loss which will cause discontinuity and corruption in the final audio/video playback.

Another challenge is that consumers may wish to use a wide variety of devices to play back the audio/video data. Some consumers will wish to watch videos on their televisions; others will watch videos on their home computers, laptops, or tablet computers; others will wish to watch videos on their cell phones. Each device may have a different capacity for playing back content, and may further restrict the volume of data that can be effectively delivered to the consumer.

A further challenge is that a consumer's capacity to receive data may change from time to time. This may occur due to factors outside the consumer's control (data demands from other consumers; network failures and interference; etc.) as well as conditions controlled by the consumer (moving a device with wireless access closer to or further away an in-house access point; activating other devices in the home which may compete for data consumption; etc).

Yet another challenge is that many consumers will wish to receive "real time" content, such as ongoing sporting events or concerts, or "broadcast" content in the form of network broadcast channels which transmit programs continually, one after another, at scheduled times. Consumers will wish to receive this content "now," at the same time that other consumers (who may not have the same provider) will be seeing the same content.

In addition, some decisions about how to provide content to consumers are best made at network locations closer to the consumers themselves. For instance, if a provider has 10,000 consumers, and 20 of those consumers reside in the same apartment building and share a single narrow network connection into the building, it would not make sense to transmit all possible live content to that apartment building, since this would overload the building's network connection. It would make more sense to transmit only the content currently requested by the building's consumers, and then relay that content to the individual consumers who have requested it. The job of collecting and relaying content would be best served by a server dedicated specifically to that apartment building, which would need to interact with some master server or servers in order to collect the necessary content.

A consumer will have the best possible playback experience, regardless of network conditions, if the consumer possesses a full local copy of the content to be played back. However, delivering a full copy of the content to a consumer is undesirable for two primary reasons. First, the client may not possess sufficient data storage capacity to store the entire body of the media content. Second, the time required to deliver the content will produce a substantial delay (possibly as long as hours) between the time the consumer indicates a desire to receive the content and the time that the consumer is actually able to begin playing back the content. There may also be copyright issues involved with full-copy distribution.

There are several tools available for solving all of the above challenges, but each tool either addresses only part of the overall solution, or introduces its own challenges. Encoding and compression technologies can produce different versions of the same contents with different bitrates. Content produced at lower bitrates will not have the same quality as content of higher bitrates, but will be more easily provided to consumers with low-volume data connections. Many web sites allow consumers to choose which bitrate they prefer to receive, but this requires a higher level of interaction than would be expected from a "traditional" television experience, where consumers would not many only need to choose which channel they wish to view, and would not need to estimate and regulate their own network usage. In addition, choosing a single bitrate leaves the consumer vulnerable to periodic fluctuations in network availability, which may periodically reduce a consumer's capacity to receive data, and so a high-bitrate stream which the consumer had been receiving without difficulty is now too large for the consumer to receive on a timely basis. And, of course, the provider cannot simply transmit the same content at several bitrates to the consumer, since this increases the consumer's data load rather than reducing it.

A technology known as HTTP adaptive streaming requires the server to encode small segments of a program at different bitrates. The client will request these segments in order and play them back, and can switch between receiving higher-bitrate segments and lower-bitrate segments as necessary based on current network conditions. This solution, however, requires data to be sent separately to each consumer, and does not allow for more efficient use of network resources by technologies such as multicast. In addition, this solution, as well as any similar adaptive solution requiring intelligence or decisions from the client device, requires a specially-constructed client device or client software application, and cannot be implemented using off-the-shelf IP television set-top boxes which expect to passively receive audio/video IP data in a single continuous stream.

IP multicasting reduces the load on data sources by allowing sources to provide their data to intermediate nodes, rather than to individual clients. For instance, a server might transmit its data ten times, once to each of ten intermediate nodes. These nodes then relay this data to ten clients each. In this way, the server has provided data to one hundred clients, even though it only sent the original data ten times. This is a common IP technology, but currently, many wi-fi access points do not handle multicast traffic well, and consumers using wi-fi access points would not be able to reliably receive content delivered via multicast. These consumers would require unicast transmissions delivered directly to the addresses of the devices connected via wi-fi.

Forward error correction (FEC) allows a data provider to include additional data within a signal that will allow a client to recalculate missing data, if some portions of the data are lost during transmission. The provider must determine how much data loss the client will be able to recalculate; it is possible to allow the client to recalculate a higher percentage of lost data by including a higher amount of additional FEC data in the data stream. Adding more FEC data, however, increases the total size of the data stream, and so the provider must balance the need for smaller data streams against the need to allow clients to recalculate lost data. When the rate of data loss has exceeded the ability of the FEC algorithm to recalculate the lost data (based on the amount of FEC provided) then data loss is inevitable.

Allowing the client (or some intermediate entity) to buffer data before delivering it or playing it back can alleviate some of the problems caused by a temporary loss of data capacity. If a client stores ten seconds worth of data before starting to play it back, that client might, in theory, be able to tolerate a loss of connection to the server for up to ten seconds without any interruption in playback; it would simply use its buffer of stored data during those ten seconds of disconnection. This, however, is another case where the solution does not provide for a traditional television-style viewing experience, where consumers are accustomed to being able to watch video content as soon as they turn on their television and select a channel. Also, this solution is only effective so long as the client is able to keep some amount of data in its buffer. If the client exhausts its buffer due to frequent or prolonged loss of signal from the source, the client will no longer have any data to provide for playback, and must halt until delivery of data can be restored.

Connecting to the clients using the TCP protocol allows for guaranteed, lossless delivery of data to clients. However, this protocol does not guarantee timely delivery of data, and delays in delivery may be experienced due to network conditions. This may interrupt smooth playback on the client end, and may also delay data so that it is no longer being delivered close to real time, in situations where a "live" real-time stream is being provided.

In summary, consistent delivery of media data over large, generally unmanaged networks continues to be a common problem. There is an outstanding need for a system and method to deliver the best quality data while simultaneously satisfying all clients on the network.

SUMMARY OF THE INVENTION

This invention overcomes deficiencies associated with network-based content distribution by controlling the flow of multimedia data and streaming characteristics to ensure real-time, consistent delivery. An adaptive media distribution system assembled in accordance with the invention includes at least one original source of a media channel, a plurality of content playback devices, and one or more stream controllers disposed between the original sources and the playback devices. Each media channel provides audio and/or video content on one or more switchable streams, each stream being encoded with different characteristics such as bitrate. The stream controllers receive streams and determine how the streams should be allocated to the playback devices so as to provide consistent delivery of the content in accordance with playback demand and the stream attributes or information.

Each media channel may comprise a continuous audio and or video signal with a series of audio and/or video frames encoded and encapsulated in a media container. For example, each media channel comprises a continuous audio and or video signal with a series of audio and/or video frames encoded and encapsulated in an MP4 container, transport stream, or other format.

The stream controllers may allocate the streams using splicing point markers encoded in the streams to switch from one stream to another. Alternatively, the stream controllers may allocate the streams to the playback devices by switching from one stream to another using external synchronization. The stream controllers include stream buffers to time-synchronize the streams.

The switchable streams may contain live or time-shifted content based upon unicast or multicast protocols. The stream controllers determine how the streams should be allocated using current or historical information, and may or may not feedback from other clients; that is, other stream controllers or playback devices. Sequence numbers may be inserted into the streams enabling the controllers and playback devices to detect and recalculate lost data using forward error correction (FEC).

Each controller maintains a catalog of the media channels available to it, including a list of the switchable streams associated with each channel. Each such catalog may include a list of the switchable streams available for each channel, the network address providing each stream, the protocol being used to transmit each stream, and/or the anticipated bitrate of each stream. Each playback device also preferably maintains a catalog of available media channels, and when a playback device receives a user command to begin playing a media channel, the playback device may consult its catalog of channels to determine the address of the stream controller for that channel, and may then send a subscription message to the controller to request the desired channel.

In a typical configuration, each stream controller has a maximum limit and a preferred limit for incoming data, and a maximum limit and a preferred limit for outgoing data. The various controller may choose switchable streams that provide the highest bandwidth without exceeding their maximum incoming and outgoing data limits. Requests may be sent to the stream controllers at periodic intervals indicating whether a particular playback device wishes to remain at the current bitrate, increase to a higher bitrate, or reduce to a lower bitrate, with the controllers attempting to accommodate the requests without exceeding their maximum incoming and outgoing data limits. A controller may allocate the streams to satisfy the highest number of recipients with the strongest preferences to switch streams, while minimizing any increase in incoming or outgoing data volume.

A method of distributing media in accordance with the invention includes the steps of providing audio and/or video content on one or more switchable streams from at least one original source of a media channel, each stream being encoded with different attributes or information, and allocating the content to a plurality of playback devices by switching from one stream to another based upon playback demand and the stream attributes or information. Additional steps are disclosed and claimed herein.

DETAILED DESCRIPTION OF THE INVENTION

Definition of Terms

Figure 1:
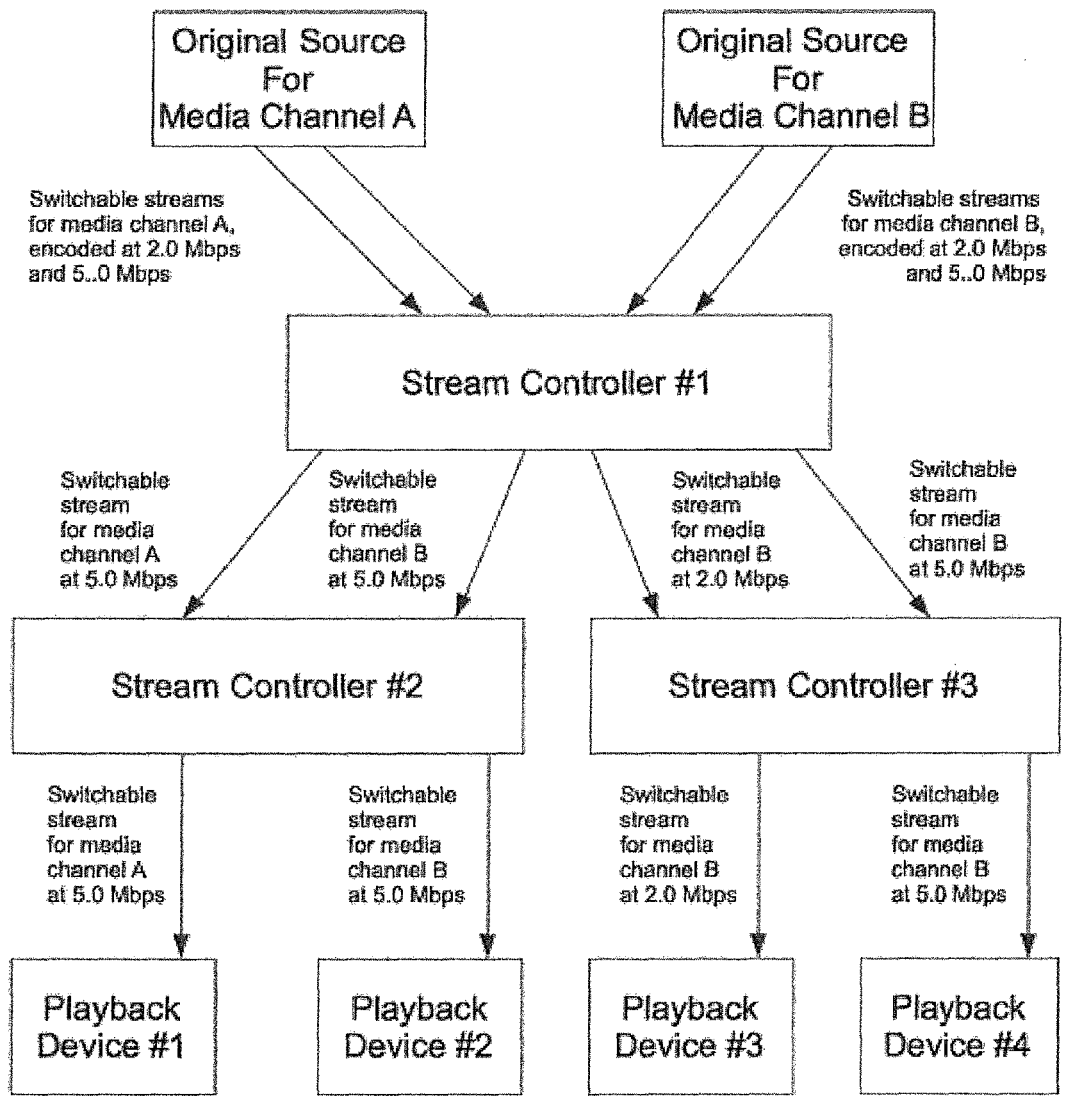
FIG. 1 is a block diagram illustrating system components.

Media channel—An audio/video program. A media channel may be provided in the form of several switchable streams, each with different characteristics, such as compression and bitrate.

Switchable Stream—An MPEG transport stream containing audio/video data, and encoded with splicing point markers to assist with seamless switching from one stream to another.

Stream Controller—A stream controller (also referred to below as simply a controller) is an intermediate data server, designed to receive switchable streams from one or more sources, and provide this streams as required to one or more clients. A stream controller acts as a source when it is providing switchable streams to other systems; it acts as a client when it is consuming switchable streams from other controllers.

Source—A system that provides switchable streams to clients. This may be an original source or a stream controller.

Original Source—The original source for a switchable stream is not a stream controller; rather, it is a system that is responsible only for producing or providing the data that comprises a switchable stream.

Client—A system that consumes switchable streams. This may be a stream controller or a playback device.

Playback Device—A system that consumes switchable streams and decodes the audio/video information for presentation to a user.

Bitrate—A measure of the rate of data transmission required to provide an audio/video stream at a rate that is as close to real time as possible. Bitrate is normally expressed in bits per second.

FEC (Forward Error Correction)—An algorithm for introducing additional data into a body of data so that if some amount of the overall data is lost, the additional data can be used to calculate the missing elements.

System Operation

This invention resides in adaptive media distribution apparatus and methods involving at least one original source of a media channel, a plurality of content playback devices, and one or more stream controllers disposed between the original sources and the playback devices. Each original source provides one or more switchable streams for each available media channel, where a media channel is a continuous audio and or video signal comprised of a series of audio and or video frames encoded and encapsulated in a media container. The container is arbitrary and can be one of many types, including, but not limited to an MP4 container, transport stream, or some other custom format. An example of this is content from an over-the-air HD signal. The original source is streamed out in real time, however, the content may be live or time-shifted.

When an original source provides multiple streams, the original source may provide these streams encoded with different attributes, (such as the bitrate of video or audio streams) or with the inclusion of additional streams of information (additional audio channels, alternate audio channels, closed captioning, metadata, images related to the data, commercial advertising information). All of the media streams derived from the same media channel should be streamed out closely time-synchronized with each other to ensure consistent stream shifting when necessary. Typically, bitrate is one of the primary parameters that differs between streams derived from the same medial channel; media encoded at higher bitrates provide higher quality, but require more network bandwidth; media encoded at lower bitrates require less bandwidth, but provide less quality.

During the encoding process, the original sources can encode splicing point markers into the media stream (this can be one of many media container formats, such as MPEG Transport Streams) to indicate points in the data stream where it is safe to switch between streams for the same media channel. The splicing point markers preferably appear in the transport streams at regular time intervals, and always in the first transport stream packet of a video frame. As opposed to specifically encoded slicing points, external stream synchronization techniques such as external clock synchronization or detection of aligned key-frames can also be used to indicate valid locations within the stream to switch.

FIG. 1 is a block diagram illustrating system components. This diagram shows components as they might be arranged and operating in a production setting. The diagram shows two original sources, each providing streams for one media channel (designated A and B). Each original source encodes two streams for each media channel: one stream at 5.0 Mbps (megabits per second) and one stream at 2.0 Mbps. The 5.0 Mbps stream is the higher-quality stream; the 2.0 Mbps stream will provide lower playback quality, but conserves bandwidth.

The diagram shows three stream controllers, operating in a hierarchical arrangement. Stream controller #1 has direct access to the original sources for both media channels, and has stream controllers #2 and #3 as its clients. Stream controllers #2 and #3 each have two playback devices as their clients. At the point in time illustrated by the diagram, stream controller #1 is consuming all switchable streams from both original sources. It is providing those streams to stream controllers #2 and #3 so that those controllers can provide the necessary streams to their own clients.

Client #1 is consuming a stream for media channel A; the other clients are consuming streams for media channel B. All clients except client #3 are receiving the high-quality 5.0 Mbps stream. Client #3, possibly due to local network congestion, is only receiving the 2.0 Mbps stream. If its network conditions improve, it can signal stream controller #3 that it wishes to shift to a higher-bitrate stream. If stream controller #3 has sufficient resources of its own to accommodate that request, it can shift client #3 to the 5.0 Mbps, which stream controller #3 is already consuming. At that point, stream controller #3 could send a signal to stream controller #1 indicating that controller #3 no longer needs the 2.0 Mbps stream for media channel B. Stream controller #1 could stop sending that stream to controller #2, and since controller #1 at that point would no longer have any clients that need the 2.0 Mbps stream for media channel B, controller #1 itself could stop consuming that stream.

In fact, the diagram shows that stream controller #1 is consuming the 2.0 Mbps stream for media channel A, even though it is not serving that stream to any clients. Stream controller #1 may have very recently ceased providing this stream to clients due to their own requests, but due to some operating detail of the controller, it has not yet had the opportunity to reconsider whether it still needs this stream. Since no clients require the 2.0 Mbps stream for media channel A; it is now safe for controller #1 to cease receiving this stream, and a diagram of the system state, drawn in the near future, would show that controller #1 is only consuming three streams from its sources.

Figure 2:
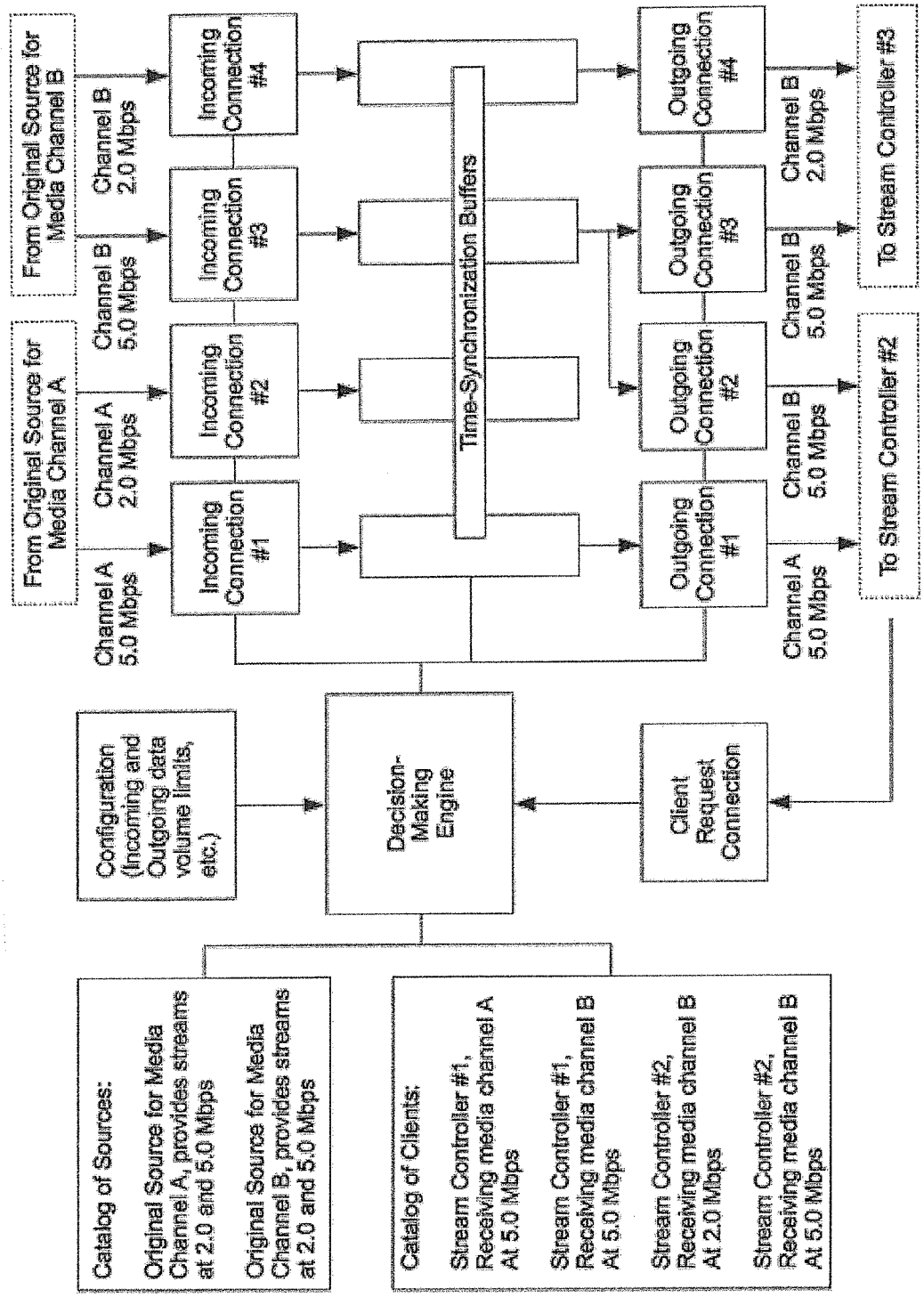
FIG. 2 is a diagram that illustrates stream controller components.

FIG. 2 is a diagram that illustrates stream controller components. This diagram provides an abstract view of the internal components of stream controller #1 depicted in FIG. 1. Shown in this diagram are:

- The controller's catalog of available sources for media channels and switchable streams
- The controller's catalog of current clients, as well as which clients are receiving which media channels and switchable streams
- The controller's configuration settings, including its preferred and maximum incoming and outgoing data volume limits
- The communication connection the controller uses to receive requests and status reports from clients
- The communication connections the controller is using to consume streams from sources
- The communication connections the controller is using to transmit streams to clients
- The data buffers used by the stream controller to perform time-synchronizing between switchable streams
- The decision engine that collects information from all other components of the stream controller, and makes the necessary choices as two which clients should receive which streams, when to switch clients from one stream to another, and so forth.

The present state of the stream controller depicted in the diagram matches the state of stream controller #1 from the previous diagram: it is consuming streams for two different media channels, each with two different streams at different bitrates; it is providing those streams to two client stream controllers.

Also note that, as in the previous diagram, the controller is consuming a 2.0 Mbps stream for media channel A, even though it has no clients for this stream; this situation may have arisen because the client that was previously requesting this stream has sent an unsubscribe request and the controller is no longer transmitting the stream. The controller will now be able to cease consuming the 2.0 Mbps stream for media channel A from it source.

Another reason that the controller might be consuming the 2.0 Mbps stream for media channel A is that it is planning to switch stream controller #2 from the 5.0 Mbps stream for channel A to the 2.0 Mbps stream, either due to stream controller #1's own resource constraints, or due to a request from stream controller #2. In this situation, controller #1 is receiving both streams for channel A and is monitoring the time-synchronizing buffers for a clean switching point between both streams. When the controller finds a switching point, it will stop transmitting the 5.0 Mbps stream for channel A to controller #2, and will immediately begin transmitting the 2.0 Mbps stream in its place. The last packet sent from the 5.0 Mbps stream and the first packet sent from the 2.0 Mbps stream will occur on the determined switching point.

In the preferred embodiments, the original source modifies the switchable streams so that the stream controllers may insert sequence numbers into individual data packets. Stream controllers and playback devices may use packet sequence numbers to detect data loss and to recalculate lost data by using FEC. For example, if the original source is providing an MPEG transport stream, the original source might insert an adaptation field into every packet, with the private data flag switched on, and with sufficient space in the adaptation field for the insertion of a sequence number. This allows a stream controller to quickly insert a sequence number into the allotted space in the adaptation field. Sequence numbers will be discussed later in the system description.

Sources may transmit data over any protocol desired, including but not limited to:
- UDP multicast
- UDP unicast
- TCP unicast Each stream controller has a catalog of the media channels available to it, which should be kept up to date by whatever means appropriate. This catalog should contain, for each media channel available to the stream controller, a unique name for the media channel, as well as a list of the switchable streams available for the channel.

The catalog should describe each switchable stream with at least the following information:
- The network address the stream is available from
- The protocol being used to transmit the stream (TCP/UDP, unicast/multicast, etc.)
- The expected bitrate of the stream Each stream controller should also be configured with a list of the network addresses and protocols that it will use to provide each individual media channel. This list of addressed and protocols will be different for each media channel that the stream controller will provide to its clients. For example, one hypothetical stream controller might be configured to provide the XYZ channel to its clients by all of the following methods:
- UDP unicast streams directly to the clients
- A UDP multicast streams transmitted to such-and-such an address
- TCP streams directly to the clients, etc.

It is the responsibility of the client to indicate to the controller which protocol the client would prefer to use in order to receive the desired media channel, as described in the following section.

Each playback device has access to a catalog of the media channels available to it. At a minimum, this catalog should contain the network address of the stream controller that provides each media channel (each channel may be provided by a different controller). If desired, this catalog may contain additional information about each channel, such as the possible bitrates and network protocols that the controller may use to provide the given channel; the catalog may, in fact, provide the same level of detail as the catalog provided to stream controllers (this will typically occur if the client is itself a stream controller).

When a playback device receives a user command to begin playing a given media channel, the playback device consults its catalog of channels, determines the address of the stream controller for that channel, and sends a subscription message to the controller to request the desired channel. In addition to the name of the desired channel, this subscription message may, as desired, also contain the following information:
- The maximum bitrate that the client is willing to accept for this channel (this information may be necessary to ensure that the stream does not exceed the client's network limitations)
- The network protocol that the client prefers to use to receive the channel (UDP/TCP, multicast/unicast, etc.)
- The network address that the client wishes the controller to transmit the channel to (this will typically be the address of one of the client's own network interfaces; this may also be omitted if the client wishes to receive a multicast, in which case the client might not know the multicast address in advance)

Upon receiving a subscription message from a client, the stream controller should validate the message to ensure that the client has requested a valid stream. If the message is valid, the stream controller determines whether it has sufficient bandwidth available to provide the requested media channel.

Each stream controller tracks the following statistics on a continuous basis:

- The switchable streams that it is consuming from sources, and all information associated with those streams, including the media channels the streams are associated with, the network addresses and protocols used by the streams, the FEC parameters of the streams, and the current bitrate of the streams.
- The clients that the controller is currently providing switchable streams to, including uniquely identifying tokens for the clients, the media channels the clients have subscribed to, the network address the streams must be transmitted to for the clients to receive them, a history of status reports from the clients, and the current bitrate of outgoing streams.

Furthermore, each stream controller should be configured with a maximum limit and a preferred limit for incoming data, and a maximum limit and a preferred limit for outgoing data. The act of providing a given switchable stream to a client may or may not cause the controller to increase its incoming or outgoing volume of data. For example:

- If the stream controller is not yet providing the chosen switchable stream to a client, the controller will begin consuming the chosen stream from a source; this will increase the volume of incoming data by the bitrate of the stream.
- If the client requests a multicast stream, and the stream controller is already broadcasting the selected stream to other clients via multicast, providing this stream to the new client will not increase the controller's outgoing data volume. However, if the controller is not yet providing this stream via multicast, or if the client has requested a dedicated unicast instead of a multicast, then providing this stream will increase the controller's outgoing data volume by the bitrate of the stream.
- There may be yet more ways to determine whether incoming or outgoing data volume will increase, based on the details of the network protocols being used.

If providing the requested stream would not cause the stream controller to exceed its maximum incoming or outgoing bandwidth limit, the controller should immediately begin providing the requested stream. If providing the requested stream would cause the controller to exceed any of its maximum limits, the controller consults its catalog to see if any source provides the same channel at a bitrate that will not cause the controller to exceed its limits. (Note that the controller does not need to consume a stream using the same protocol that it uses to provide the stream to its clients; the controller may use a different protocol, if one is available, and the protocol allows the controller to remain within its maximum data limits.) The controller should choose a switchable stream that provides the highest bandwidth that does not exceed the bandwidth requested by the client, and that does not cause the controller to exceed its maximum incoming and outgoing limits. If there is no such stream available for the requested media channel, the controller must send a message back to the client indicating that the subscription request has been denied.

If the stream controller is able to provide the media channel to the client, the controller should begin transmitting the chosen switchable stream immediately (if it is not already doing so, as in the case of a multicast) and should send a reply back to the client with the network details of the provided stream (address and protocol), the bitrate of the provided stream, and the FEC details of the provided stream. These details must include the FEC algorithm parameters necessary for clients to decode FEC data such as the number of original data packets and the number of FEC data packets to be fed to each iteration of the FEC algorithm.

It is typically the responsibility of the stream controller (not the original source) to add FEC data to the stream (although, if an upstream controller has already added FEC data to the stream, downstream controllers can merely accept the existing FEC data and pass it along). The controller may use any algorithm desired (such as Reed-Solomon) to calculate FEC data. A suggested process for inserting Reed-Solomon FEC data into an MPEG Transport Stream is as follows:

1. Group the transport stream packets of the switchable stream into network transmission packets (for instance, when transmitting data over UDP, the controller may group 7 transport stream packets of 188 bytes each into a single 1316-byte UDP packet, which fits within the commonly accepted MTU size of 1500 bytes for UDP packets).

2. Group the network packets into FEC encoding blocks. Each block will contain the same number of network packets, chosen based on the algorithm and on the FEC strength desired.

3. Insert sequence numbers into each network packet. As has been suggested previously for MPEG transport streams, the original source should have added an adaptation field to each transport stream packet, with the private data bit turned on. The stream controller can simply write sequence numbers into these adaptation fields, such that the sequence numbers assigned to each network packet are continuous with the sequence numbers of the surrounding packets. For example, the transport stream packets within the first outgoing UDP packet might contain sequence numbers of 1; the transport stream packets within the next outgoing UDP packet would have sequence numbers of 2; and so forth, incrementing by 1 for each outgoing UDP packet. In this way, the loss of any UDP packet can be deduced by a gap in sequence numbers between neighboring packets.

4. Use the FEC algorithm to calculate additional FEC packets for each block of network packets. Again, the number of FEC packets generated will depend on the algorithm and the 1-EC strength desired.

5. Take the data from the calculated FEC packets and use it to populate the payload of a series of new transport stream packets. These new transport stream packets should contain a PID (packet ID) that is reserved for FEC data and is not used by any other program or elementary stream in the transport stream. Group these new transport stream packets into network packets.

6. Transmit the original network packets and the packetized FEC data to the desired clients. Follow each original FEC encoding block with the packets generated for that block.

Typically, a client will wish to receive the highest bitrate possible for its chosen media channel, without saturating its network connection. The client may use the packet sequence numbers included in the incoming switchable stream to determine the current rate of network data loss. If the client finds a gap in the sequence numbers of incoming packets, it can compare the number of missing packets to the number of received packets to determine an overall percentage of lost packets, and can use that statistic to determine whether the device should receive a lower bitrate stream (because the loss rate of the current stream is excessive) or a higher bitrate stream (if the loss rate of the current stream is low enough that a higher bitrate stream may be tolerable).

The client may also need to switch bitrates due to other constraints, such as CPU usage or graphics processor usage.

The device should make these determinations as necessary based on its own requirements.

At periodic intervals, the client sends a signal to the stream controller indicating whether the device wishes to remain at the current bitrate, or wishes to receive a higher bitrate, or wishes to receive a lower bitrate. When the client indicates a desire to switch to a new bitrate, the client should also indicate a priority level for that request. For instance, if a device is detecting a small amount of data loss that has only a minor effect on playback quality, the device may send a low-priority request for a lower bitrate; if the device is losing a high amount of data, the device may send a high-priority request for a lower bitrate.

Since FEC data is included in the switchable stream, the playback device may be able to accept a certain rate of data loss without affecting quality of playback. The device should attempt to use the FEC data to recalculate missing network packets whenever the rate of loss is low enough for the FEC algorithm to be effective.

As stream controllers receive status reports from clients, the controllers must decide whether to honor requests of clients who wish to receive higher or lower bitrate streams. The factors involved in this decision are similar to the factors used to determine whether to begin transmitting a stream to client in response to a subscription request and can be based on current or historical data.

Examples of decision making criteria:
- If there is a stream with the desired bitrate available, but the controller is not currently receiving this stream, the controller must subscribe to this stream, which will increase its incoming data volume.
- If switching a client to a new stream means that there is no longer any demand for the client's old stream (that is, no other clients are receiving the old stream), then the stream controller will be able to unsubscribe from that stream. This will decrease the controller's incoming data volume.
- If the client is receiving a unicast stream, switching it to a higher bitrate stream will increase outgoing data volume, while switching it to a lower bitrate stream will decrease outgoing data volume.
- If the client is receiving a multicast stream, and switching the client to a new stream means that there will no longer be any clients receiving the old multicast, then the controller can drop the old multicast, resulting in a reduction of outgoing data volume. If the old multicast must still be provided to existing clients, then outgoing data volume cannot be reduced. If there are already clients receiving a multicast for the stream that the switching client will move to, then there is no increase in outgoing data volume by moving the client to an already-existing multicast. If there is not yet a multicast for the client's new stream, then the controller must begin a new multicast, which will increase outgoing data volume.

Since a stream controller will be receiving status reports from multiple clients, it may not have sufficient bandwidth to honor all switching requests from all clients. The controller should not honor a switching request that would cause it to exceed its preferred incoming or outgoing data limits (although, as mentioned earlier, a controller may exceed its preferred limits when answering an initial subscription request from a client, but may not in any case exceed its maximum limits).

When choosing which requests to honor and which to ignore, a controller will typically choose to honor requests that satisfy the highest number of clients with the strongest preferences to switch streams, while minimizing any increase in incoming or outgoing data volume. Requests that will result in an overall decrease in data volume may always be honored. Requests from clients who are all receiving the same multicast may be honored with minimal impact to data volume, since these clients are all being served by a single data transmission.

Furthermore, if a controller determines at any time that it has exceeded its preferred data limits (due to new client subscriptions or an increase in the volume of incoming streams) it will attempt to move back below its limits by switching clients to lower-bitrate streams. The controller should attempt to minimize its impact to clients when attempting to lower its rate of data consumption by three methods. First, the controller should attempt to switch as few clients as possible to lower bitrates in order to achieve acceptable data transmission volumes. Second, the controller should prefer to reduce the data volume to clients who are already receiving high-bitrate (and thus high-quality) streams, rather than reduce the data volume of clients who are already receiving low-bitrate (and thus low-quality) streams. Third, the controller should prefer to reduce the data volumes of clients who are not indicating a strong preference to switch to a higher-bitrate stream; when possible, the controller should reduce the data volumes of clients who are already expressing some preference to switch to lower-bitrate streams.

After the controller has received a status report from a client, the controller should send a response to the status report. This response will normally contain the characteristics of the stream that the client is already receiving (network address, FEC characteristics, expected bitrate, etc.). Additionally, if the controller has determined that it will switch the client to a new stream, as described above, the response message will also contain the characteristics of the new stream.

When the stream controller has determined that it will switch one or more clients of a given switchable stream to a stream with a different bitrate, it must ensure that it is consuming the streams of both the old and new bitrates from the sources that provide them. If the controller is not yet consuming the stream with the new bitrate, it will begin to do so (and if the source is another stream controller, the client controller will send a subscription message to the source controller, as discussed elsewhere herein).

When feasible, stream controllers should examine the content to ensure that data (such as time stamps) within streams for the same media channel are as close to time synchronized as possible. Buffers may be used on the system to provide opportunities for resynchronizing content when the time stamps diverge between media sources, if the stream controller has sufficient means. When switching a client between one stream and another, the controller should hold all data from the old and the new streams in temporary internal buffers. The controller will continually compare the contents of those buffers until it finds an indication that the client can be switched from one stream to another with no discontinuity that would be noticed during playback. For example, if the stream controller is receiving and sending MPEG transport streams, and the controller detects transport stream packets from each stream that both contain a splicing point marker, and both packets contain the same PTS value in their PES headers, then these packets would provide an acceptable switching point from one stream to the other.

If the controller is not immediately able to find a matching splicing point in both streams, the controller will need to continue to transmit data from the old stream to the clients until a match can be found. If no match is found in a reasonable amount of time (due to some timing or synchronization issue between the streams), the controller should abandon the current attempt to switch streams and continue to send the old stream to its clients. The controller may send some sort of warning message to system operators to announce this failure, and may be allowed to attempt the switch again later, if clients are still requesting a switch.

Once the controller has a matching splicing point in each buffer, the controller should transmit data from the old stream's buffer to the necessary clients, up to, but not including, the splicing point packet. The controller should mark the final packet sent from the old stream by using a special marker (if stream controllers are adding sequence numbers to packets, a sequence number reserved specifically to indicate a stream shift might be an appropriate marker). This final packet may be a packet containing media channel data, or may be an empty packet containing only the final packet marker, as desired or necessary for the system.

The controller should then begin transmitting data from the new stream's buffer, starting with the matched splicing point packet. At this point, if there are no other clients that require the older stream, the controller may cease its subscription to this stream (the unsubscribe process is described later).

Multicasts provide additional complications to the switching process. Even if the controller is already providing a multicast for the stream that the client wishes to switch to, the client cannot simply attempt to pick up the new multicast while it is in progress; it must begin consuming the new stream with the packet that matches the splicing point the old stream stopped at. The most certain way to ensure that the client begins consuming the new stream with the correct packet is to start a new multicast on a new network address, starting with the desired packet. Since it does not make sense to send out multiple multicasts for the same switchable stream, it is necessary to use the splicing process to switch all clients of the stream to the new multicast. In other words, if the client A is receiving a stream on multicast address X, and client B is receiving a stream on multicast address Y, and the controller has decided to switch client A to the same stream that client B is receiving, the controller must switch both client A and client B to a new multicast at address Z. For client A, multicast Z is a new stream with a new bitrate; for client B, this is the same stream the client was already receiving, but at a new address. Since this represents a slight disruption to clients who are not actually switching bitrates, it is preferable to switch all clients on the same multicast to a new stream at the same time; when this occurs, there is no need to begin a new multicast, since the last packet of the old stream can be immediately followed by the first packet of the new stream on the same multicast address. The controller may take this option into account when making its periodic stream switching decisions, and should have appropriate criteria for determining when it is reasonable to switch all clients of the same multicast (for instance, whether it is necessary for all clients of a multicast to indicate the same preference to move to a higher-bitrate or a lower-bitrate stream before switching them all to a new stream, or whether all clients of the multicast can be switched if a certain threshold of clients express a sufficiently strong desired to switch).

As has been described so far, when a stream controller is going to switch a client to a different switchable stream, the controller will notify the client of this switch in two ways; first, by including details of the new stream in a response to a client status report; second, by marking the final packet of the old stream with a stream termination sequence number. When the playback device receives the details of the new stream in response to its status report, it should immediately open a network connection for the new stream and should begin monitoring for the arrival of new data on this connection. If the new data arrives while data is still arriving for the old stream, the client should simply buffer this data until the old stream ceases.

When the client receives a packet of data from the old stream with a stream termination sequence number, the client can then drop the network connection for the old stream, and can begin normal consumption and usage of the data from the new stream, beginning with any data from the new stream that was buffered while waiting for the old stream to cease. Since the controller has chosen the final packet of the old stream and the first packet of the new stream so that they form a continuous and coherent media stream, this switch from the old stream to the new stream should not affect the quality of audio/video playback. If the difference in quality between the two streams is subtle, the final consumer may not notice the switch.

If, due to some malfunction, data continues to arrive for the old stream for a prolonged period of time, the client must arbitrarily cease receiving the old stream and begin normal consumption and usage or playback of the new stream. Similarly, if data stops arriving for the old stream, but the client has not received a packet with a stream termination sequence number, the client may wait a short period of time for further data to arrive from the old stream; but after a set period of time has elapsed, the client should give up on the old stream and should begin normal consumption of the new stream.

When a client wishes to cease receiving a stream (due to user command or any other reason) it will send an unsubscribe message to the stream controller that is providing the switchable stream. If the stream is being sent to the playback device via unicast, the controller should cease providing this unicast; if the stream is being sent to the device via multicast, however, the controller must continue to provide the multicast to its remaining subscribers. If this device was the last client that was receiving a given switchable stream, and the controller is no longer providing that stream to any other clients, the controller itself may unsubscribe from the source of that stream. If the source was another stream controller, the client controller will send an unsubscribe message to the source controller, and the source controller will follow the same unsubscription process.

If the client ceases to send periodic status reports to the stream controller for any reason (such as network connection loss, power failure or system failure on the client end, etc.), and status reports do not resume after a set period of time has elapsed, the stream controller should unsubscribe the client from the stream. This ensures that the stream controller will not continue to send switchable streams to "lost" clients.

Once a client is no longer subscribed to a given stream, this may reduce the stream controller's outgoing or incoming volume of data, depending on whether it was able to cease sending or receiving a stream, as described above. These reduced data volumes may allow the stream controller to switch other clients to higher bitrate streams, if they so desire, as has been described previously.

The overall system can transmit media data to off-the-shelf, third-party devices (such as TV set-top boxes) so long as the stream controllers can deliver media streams that the client devices can consume (such as MPEG transport streams delivered via multicast). To accommodate the fact that these client devices were not specifically designed to interact with the stream controllers described herein, the system operators/designers may build an additional software program that can act as an assistant to the client devices. This assistant will send any commands to the stream controller that the client device cannot send itself, such as subscribe and unsubscribe messages, and periodic status reports. If the client device has any facility for sending any form of subscribe/unsubscribe/status messages, the assistant program can accept these messages from the client and send translated messages to the stream controller. Similarly, if the assistant program can use any other source of information to deduce the current needs of the client devices, the assistant can send the necessary messages to the stream controller.

For example, if the client consumes IP multicast transmissions, it will send an IGMP "join" message when it wishes to subscribe to the multicast. An assistant program can detect the "join" message and send an appropriate subscribe message to the stream controller in order to activate the multicast that the client wishes to join. Similarly, the assistant can detect the periodic IGMP "membership report" messages from the client and can translate these into status report messages for the stream controller. These messages will not necessarily provide feedback about packet loss, but will inform the controller that the multicast is still required so that the controller does not cease transmitting the multicast. An off-the-shelf multicast client device will not be able to react to any form of stream switching commands in order to move between multicasts of different bitrates; for such clients, the stream controller must switch all clients receiving the same multicast to a new stream all at the same time, retaining the same multicast address for the stream, as has been described previously when discussing the implications of multicast protocols in the stream switching process.

The invention claimed is:

1. An adaptive media distribution system, comprising:
   at least one original source of a media channel providing audio and/or video content on one or more switchable streams, each stream being encoded with different attributes or information;
   the distribution system defining a client side including a plurality of content playback devices, and a server side including a hierarchy of stream controllers disposed between the original sources and the playback devices;
   wherein each stream controller is operative to receive a plurality of the switchable streams and determine, without input from the playback devices, how the streams should be allocated to the playback devices to provide consistent delivery of the content in accordance with playback demand and the stream attributes or information; and
   wherein each media channel comprises a continuous audio and or video signal with a series of audio and/or video frames encoded and encapsulated in a media container.

2. The adaptive media distribution system of claim 1, wherein the media container is an MP4 container, transport stream, or other format.

3. The adaptive media distribution system of claim 1, wherein the bitrate of the stream is one of the stream attributes.

4. The adaptive media distribution system of claim 1, wherein the stream controllers allocate the streams using splicing point markers encoded in the streams to switch from one stream to another.

5. The adaptive media distribution system of claim 1, wherein the stream controllers allocate the streams to the playback devices by switching from one stream to another using external synchronization.

6. The adaptive media distribution system of claim 1, wherein the stream controllers include stream buffers to time-synchronize the streams.

7. The adaptive media distribution system of claim 1, wherein sequence numbers are inserted into the streams enabling the controllers and playback devices to detect and recalculate lost data using forward error correction (FEC).

8. The adaptive media distribution system of claim 1, wherein the switchable streams utilize unicast or multicast protocols.

9. The adaptive media distribution system of claim 1, wherein the stream controllers determine how the streams should be allocated using current or historical information.

10. The adaptive media distribution system of claim 1, wherein the streams contain live or time-shifted content.

11. The adaptive media distribution system of claim 1, wherein the stream controllers determine how the streams should be allocated using feedback from other stream controllers of playback devices.

12. The adaptive media distribution system of claim 1, wherein each controller maintains a catalog of the media channels available to it, including a list of the switchable streams associated with each channel.

13. The adaptive media distribution system of claim 1, wherein each controller maintains a catalog of the media channels available to it, including:
   a list of the switchable streams available for each channel,
   the network address providing each stream,
   the protocol being used to transmit each stream, and
   the anticipated bitrate of each stream.

14. The adaptive media distribution system of claim 1, wherein each playback device maintains a catalog of available media channels.

15. The adaptive media distribution system of claim 1, wherein:
   each playback device maintains a catalog of available media channels; and
   when a playback device receives a user command to begin playing a media channel, the playback device consults its catalog of channels, determines the address of the stream controller for that channel, and sends a subscription message to the controller to request the desired channel.

16. The adaptive media distribution system of claim 1, wherein, when a playback device receives a user command to begin playing a media channel, the playback device consults its catalog of channels, determines the address of the stream controller for that channel, and sends a subscription message to the controller to request the desired channel along with the maximum acceptable bitrate.

17. The adaptive media distribution system of claim 1, wherein, when a playback device receives a user command to begin playing a media channel, the playback device consults its catalog of channels, determines the address of the stream controller for that channel, and sends a subscription message to the controller to request the desired channel along with the maximum acceptable bitrate and request priority level.

18. The adaptive media distribution system of claim 1, wherein each stream controller has a maximum limit and a preferred limit for incoming data, and a maximum limit and a preferred limit for outgoing data.

19. The adaptive media distribution system of claim 1, wherein:
   each stream controller has a maximum limit and a preferred limit for incoming data, and a maximum limit and a preferred limit for outgoing data; and
   the controllers choose switchable streams that provide the highest bandwidth without exceeding their maximum incoming and outgoing data limits.

20. The adaptive media distribution system of claim 1, wherein:
- each stream controller has a maximum limit and a preferred limit for incoming data, and a maximum limit and a preferred limit for outgoing data;
- requests are sent to the stream controllers at periodic intervals indicating whether a particular playback device wishes to remain at the current bitrate, increase to a higher bitrate, or reduce to a lower bitrate; and
- the controllers attempt to accommodate the requests without exceeding their maximum incoming and outgoing data limits.

21. The adaptive media distribution system of claim 1, wherein:
- each stream controller has a maximum limit and a preferred limit for incoming data, and a maximum limit and a preferred limit for outgoing data;
- a controller will allocate the streams to satisfy the highest number of recipients with the strongest preferences to switch streams, while minimizing any increase in incoming or outgoing data volume.

22. The system of claim 1, wherein any stream controller in the hierarchy may decide which streams are delivered downstream.

23. The system of claim 1, wherein clients may be bundled into receiver groups for shared multicast applications.

24. The system of claim 1, wherein clients may be dynamically adjusted, created and destroyed in real time by the server side.

25. The system of claim 1, wherein the service side may use information about the total number of video channels being served to a dynamically created group of viewers.

26. The system of claim 1, wherein the playback devices may not be aware that they are subject to being rate shifted or served adaptive content.

27. A media distribution method, comprising the steps of:
- providing audio and/or video content on one or more switchable streams from at least one original source of a media channel, each stream being encoded with different attributes or information;
- allocating the content to a plurality of playback devices by switching from one stream to another based upon playback demand and the stream attributes or information;
- wherein the step of allocating the content is performed by a hierarchy of stream controllers without input from the playback devices: and
- wherein each media channel comprises a continuous audio and or video signal with a series of audio and/or video frames encoded and encapsulated in a media container.

28. The method of claim 27, wherein the media container is an MP4 container.

29. The method of claim 27, wherein the bitrate of the stream is one of the stream attributes.

30. The method of claim 27, including the steps of:
- encoding splicing point markers in the streams; and
- switching from one stream to another using the splicing point markers.

31. The method of claim 27, including the step of switching from one stream to another using external synchronization.

32. The method of claim 27, further including the step of buffering the streams to time-synchronize the streams.

33. The method of claim 27, including the step of inserting sequence numbers into the streams to detect and recalculate lost data using forward error correction (FEC).

34. The method of claim 27, wherein the switchable streams utilize unicast or multicast protocols.

35. The method of claim 27, including the step of choosing switchable streams that provide the highest bandwidth without exceeding maximum data limits.

36. The method of claim 27, including the steps of:
- receiving requests indicating whether a particular playback device wishes to remain at the current bitrate, increase to a higher bitrate, or reduce to a lower bitrate; and
- accommodating the requests without maximum data limits.

37. The method of claim 27, including the step of allocating the streams to satisfy the highest number of recipients with the strongest preferences to switch streams, while minimizing any increase in data volume.

38. The method of claim 27, including the step of allocating the streams using current or historical information.

39. The method of claim 27, wherein the streams contain live or time-shifted content.

40. The method of claim 27, including the step of allocating the streams using feedback from other stream controllers of playback devices.

41. The method of claim 27, wherein any stream controller in the hierarchy may decide which streams are delivered downstream.

42. The method of claim 27, wherein clients may be bundled into receiver groups for shared multicast applications.

43. The method of claim 27, wherein clients may be dynamically adjusted, created and destroyed in real time by the server side.

44. The method of claim 27, wherein the service side may use information about the total number of video channels being served to a dynamically created group of viewers.

45. The method of claim 27, wherein the playback devices may not be aware that they are subject to being rate shifted or served adaptive content.

* * * * *